(12) United States Patent
Yumura et al.

(10) Patent No.: US 7,166,804 B2
(45) Date of Patent: Jan. 23, 2007

(54) TERMINAL STRUCTURE OF SUPERCONDUCTING CABLE AND SUPERCONDUCTING CABLE LINE THEREWITH

(75) Inventors: Hiroyasu Yumura, Osaka (JP); Yoshihisa Takahashi, Tokyo (JP); Kimiyoshi Matsuo, Tokyo (JP); Shoichi Honjo, Tokyo (JP); Tomoo Mimura, Tokyo (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 133 days.

(21) Appl. No.: 10/947,273

(22) Filed: Sep. 23, 2004

(65) Prior Publication Data

US 2005/0061537 A1   Mar. 24, 2005

(30) Foreign Application Priority Data

Sep. 24, 2003   (JP) .............................. 2003-332280

(51) Int. Cl.
*H01B 12/00* (2006.01)
(52) U.S. Cl. ........................ 174/125.1; 505/887; 174/34
(58) Field of Classification Search ............. 174/125.1, 174/887, 36, 34; 505/887
See application file for complete search history.

(56) References Cited

U.S. PATENT DOCUMENTS 4,894,906 A   1/1990   Huang

| 4,966,142 A | 10/1990 | Zimmerman et al. |
| 5,098,656 A | 3/1992 | Zimmerman et al. |
| 5,292,051 A | 3/1994 | Nagahiro |

FOREIGN PATENT DOCUMENTS

| DE | 34 13 167 A | | 10/1985 |
| JP | 05-190030 | * | 7/1993 |
| JP | 405190030 A | * | 7/1993 |
| JP | 2001-052542 A | | 2/2001 |

OTHER PUBLICATIONS

K. Iizuka et al., Power Cable Technology Handbook, New Addition, Chapter 12: Mono-core Cable's Sheath Potential and Sheath Loss and Measures Against the Same, (1989), pp. 645-648.

* cited by examiner

*Primary Examiner*—Hung V. Ngo
(74) *Attorney, Agent, or Firm*—Foley & Lardner

(57) ABSTRACT

The present invention provides a terminal structure of a superconducting cable including a cable core having a superconducting shield layer and an electrical insulation layer. The superconducting shield layer has a radially outer portion provided with by a connection electrode and the superconducting shield layer and the connection electrode are connected together with a low melting solder. The connection electrode has a ground wire connected thereto to ground the superconducting shield layer. For a multiphase cable including a plurality of cable cores, connection electrodes are linked by a conductive coupling member to short circuit superconducting shield layers. The superconducting shield layer can be grounded without impaired insulating property of the electrical insulation layer.

7 Claims, 3 Drawing Sheets

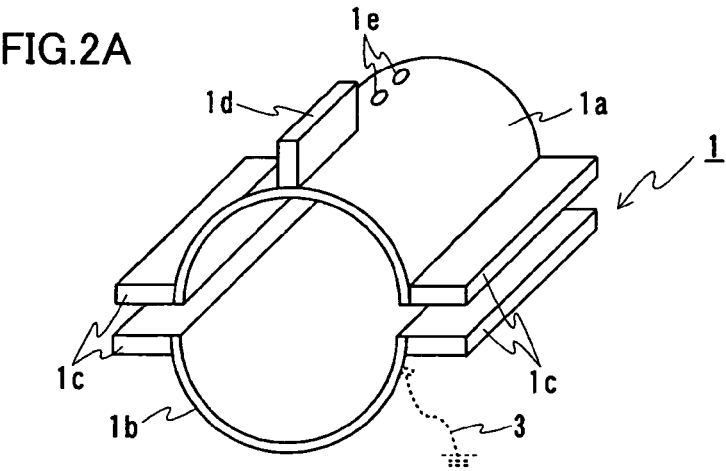
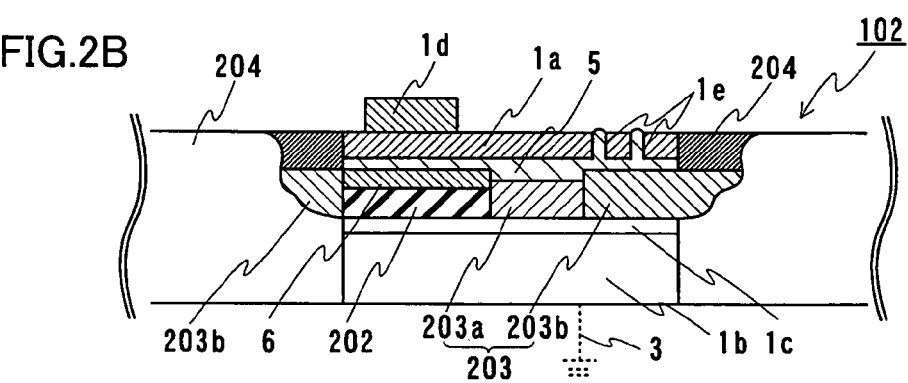
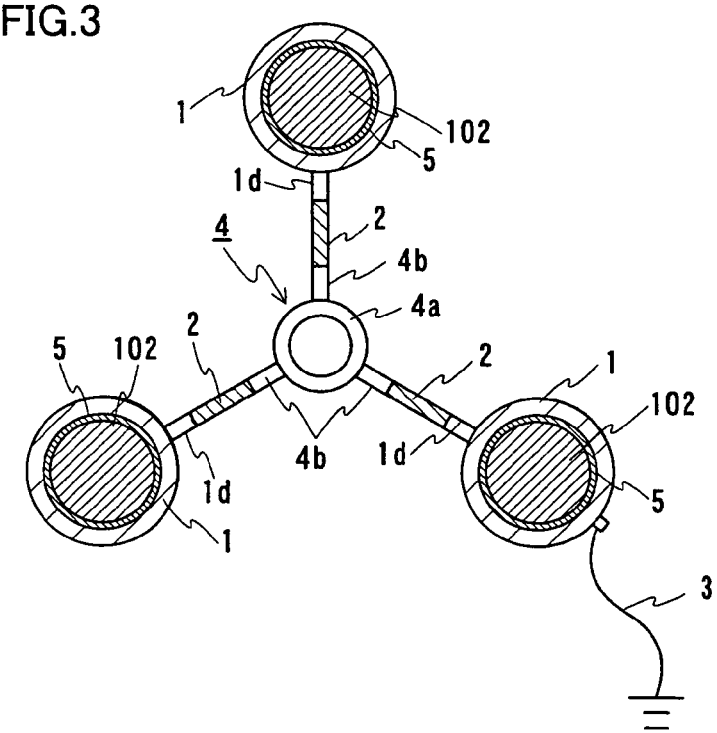

TERMINAL STRUCTURE OF SUPERCONDUCTING CABLE AND SUPERCONDUCTING CABLE LINE THEREWITH

BACKGROUND OF THE INVENTION

1. Field of the Invention

The present invention relates generally to terminal structures of superconducting cables including a cable core having a superconducting layer, and superconducting cable lines including the terminal structure, and particularly to terminal structures of superconducting cables helping to attach a ground wire to the superconducting layer while preventing an electrical insulation layer from having impaired insulating property, and lines including the terminal structure.

2. Description of the Background Art

As one of superconducting cables that have been produced using a superconductor layer formed of a Bi-based high-temperature superconducting tape for example, not only a single phase cable including a single cable core but a multiphase superconducting cable of multicore type that is produced by assembling a plurality of cable cores into one unit is also under development.

Referring to FIG. 5, this superconducting cable 100 includes three cable cores 102 twisted and housed in a thermal insulation pipe 101. Thermal insulation pipe 101 has an outer pipe 101a and an inner pipe 101b. This double pipe constructed of these outer pipe 101a and inner pipe 101b has a thermal insulation material (not shown) provided therein and a vacuum is produced within the double pipe.

These cable cores 102 each include, in the order starting from the innermost component, a former 200, a superconductor layer 201, an electrical insulation layer 202, a superconducting shield layer 203, and a protection layer 204. Superconductor layer 201 is constructed by winding superconducting wires around former 200 in a spiral manner in layers. Electrical insulation layer 202 is formed of wound insulation paper formed of polypropylene and kraft paper in lamination. Superconducting shield layer 203 is constructed by winding superconducting wires similar to that of superconductor layer 201 around electrical insulation layer 202 in a spiral manner. In this superconducting shield layer 203, in a steady state, a current is induced of substantially the same magnitude as and opposite in direction to a current flowing through superconductor layer 201. The induced current creates a magnetic field, which can cancel out a magnetic field generated from superconductor layer 201 and thus there is substantially no magnetic field leaking outside cable core 102. A space 103 formed between inner pipe 101b and each cable core 102 normally provides a path where a refrigerant flows. Thermal insulation pipe 101 has a radially outer portion provided with an anticorrosion layer 104 of polyvinyl chloride.

For normal conducting multiphase cables, by contrast, it is known that normally each cable core has a shield layer grounded to obtain a ground potential for each phase. This technique is described for example in *Power Cable Technology Handbook, New Edition* by Kihachiro Iizuka, Kabushiki Kaisha Denkishoin, Mar. 25, 1989, first edition, first copy, p. 645. The shield layer is grounded by directly attaching a ground wire to the shield layer and grounding the wire, connecting the wire to a grounded construction. The ground wire is often attached to the shield layer by bonding using typical solder having a melting point of approximately 190° C., compression-bonding, or the like.

A superconducting cable also requires having a superconducting shield layer processed, and grounding the superconducting shield layer is desired. If the superconducting cable has the superconducting shield layer grounded in the manner employed to ground a normal conducting cable's shield layer, however, a problem arises: First, a superconducting layer is formed of a superconducting wire which does not have a mechanical strength that can endure compression bonding. As such, such compression molding as employed for normal conducting cables cannot be employed. If the superconducting cable has the superconducting shield layer with a ground wire attached thereto by using the above-described, typical solder, which has a melting point higher than the temperature limit of the electrical insulation layer underlying the superconducting shield layer, the heat applied to melt the solder impairs the electrical insulation layer's insulating property.

Furthermore, directly attaching a ground wire to the superconducting shield layer of the superconducting cable may damage a superconducting wire configuring the superconducting shield layer and impair the electrically insulation layer's insulating property, as described above. Accordingly, rather than directly attaching a ground wire to a superconducting shield layer, indirectly attaching the ground wire to the superconducting shield layer is desired.

SUMMARY OF THE INVENTION

A main object of the present invention is to provide a terminal structure of a superconducting cable allowing a superconducting layer to be grounded without impaired characteristic of the superconducting layer, a superconducting shield layer, in particular, and impaired insulating property of an electrical insulation layer, and a superconducting cable line including the terminal structure. Another object of the present invention is to provide a terminal structure of a superconducting cable in a multiphase cable that has a superconducting shield layer appropriately processed to pass an induced current, and a superconducting cable line including the terminal structure.

The present invention achieves the above objects by arranging a connection electrode at a radially outer portion of a superconducting layer and also connecting the superconducting layer and the connection electrode with a solder having a low melting point.

More specifically the present invention is a terminal structure of a superconducting cable including a cable core having a superconducting layer and an electrical insulation layer that further includes a connection electrode arranged at an radially outer portion of the superconducting layer and the connection electrode and the superconducting layer are connected with a low melting solder. Furthermore when the superconducting layer is a superconductor layer and a superconducting shield layer the connection electrode is arranged at a radially outer portion of the superconducting shield layer and the connection electrode has a ground wire attached thereto. Furthermore when the superconducting cable is a multiphase cable including a plurality of cable cores the connection electrode is arranged at a radially outer portion of a super conducting shield layer of each cable core and such connection electrodes are linked by a conductive coupling member.

In accordance with the present invention a superconducting cable has a superconducting layer having a radially outer portion provided with a conductive connection member (a connection electrode) fixed to the superconducting layer by employing a low melting solder to prevent an electrical insulation layer from having impaired insulating property associated with attaching the connection member. The connection electrode can have a ground wire previously attached thereto, and the electrode with the wire can be attached to the superconducting layer, the superconducting shield layer, in particular, to eliminate the necessity of directly attaching the ground wire to the superconducting shield layer. This can prevent the superconducting shield layer from damage associated with attaching the ground wire and also prevent the electrical insulation layer from having impaired insulating property.

Furthermore, if the superconducting cable is a multiphase cable including a plurality of cable cores, each cable core may have a superconducting shield layer having a radially outer portion provided with a connection electrode and the superconducting shield layer and the connection electrode may be connected with a low melting solder, and each superconducting shield layer may be grounded. The present inventors have studied the same and as a result have found that when each cable core has the superconducting shield layer grounded a problem arises, as follows: a superconducting cable passes a significantly larger current than a normal conducting cable. If each cable core has its superconducting shield layer grounded via the earth, each cable core may disadvantageously have the superconducting shield layer connected via the earth. If such is done, the superconducting shield layer, large in connection resistance, passes a current smaller in magnitude than that flowing through a superconductor layer. Thus each cable core's superconducting shield layer cannot create a magnetic field that can cancel a magnetic field generated from each cable core's superconductor layer and a large magnetic field is generated external to each cable core. Accordingly in the present invention cable cores have their respective superconducting shield layers having radially outer portions, respectively, provided with connection electrodes, respectively, connected together by a conductive coupling member to reduce connection electrode and short circuit the superconducting shield layers. A magnetic field that can cancel a magnetic field generated from each cable core's superconductor layer can be generated at each superconducting shield layer. A magnetic field leaking from each cable core can thus be reduced.

Hereinafter the present invention will be described more specifically.

The present invention is directed to a superconducting cable including a cable core having a superconducting layer and an electrical insulation layer. As such, it may be a single phase cable including a single cable core as described above, or a multiphase cable including a plurality of cable cores as described above. The multiphase cable includes a 3-phase superconducting cable having three cable cores twisted together and accommodated in a thermal insulation pipe. The cable may be any of known superconducting cables.

The superconducting layer includes a superconductor layer and a superconducting shield layer. It is recommended that these superconducting layers be formed by helically winding a wire formed of a Bi2223-base superconducting material and they may be provided in a single layer or multiple layers. For the multiple layers, insulation paper formed of polypropylene and kraft paper in lamination is wound between the layers to provide an insulation layer. Furthermore between the superconductor layer and the superconducting shield layer an electrical insulation layer is interposed. It is recommended that the electrical insulation layer be formed by winding PPLP® or similar insulation paper formed of polypropylene and kraft paper in lamination. Furthermore in the present invention the superconductor layer has a radially outer portion provided with a connection electrode and the superconductor layer and the connection electrode are bonded together with a low melting solder.

Solder has a melting point varying depending on its chemical composition. In the present invention is used a low melting solder, a solder having a melting point lower than typically used solder having a melting point of approximately 190° C. (hereinafter simply referred to as "the typical solder"). More specifically, a solder having a melting point lower than the electrical insulation layer's temperature limit, is used. The electrical insulation layer is formed of PPLP® or similar insulation paper formed of polypropylene and kraft paper in lamination having a temperature limit of approximately 130° C. That is, the typical solder, having a melting point higher than the electrical insulation layer's temperature limit, would invite impaired insulating property of the electrical insulation layer. Accordingly to prevent the electrical insulation layer from having impaired insulating property a solder having a melting point of less than 130° C., more preferably at most 120° C., is used. On the other hand, a solder is desired that does not melt and also has a level of mechanical strength for a range from a normal temperature to an extremely low temperature at which the cable is cooled by refrigerant. Solder having such properties includes that having a melting point of at least 60° C. Such low-melting solder may be commercially available solder.

Furthermore in attaching the connection electrode a temperature sensor can be attached for example on the electrical insulation layer, the superconducting shield layer and/or the like to confirm each layer's temperature to better prevent the electrical insulation layer from having impaired insulating property. The temperature sensor includes a thermocouple or the like. It is recommended that the temperature sensor be attached with tape, solder or the like, and removed after the connection electrode is attached with the low melting solder at a radially outer portion of the superconducting layer.

The connection electrode is used to link a ground wire, superconducting layers together, and/or the like. It is recommended that such connection electrode be formed of conductive material such as copper, aluminum (both having a specific resistance $\rho$ at $77K=2\times10^{-7}\Omega\cdot cm$) or similar metal having a small electrical resistance at a refrigerant's temperature at which the superconducting cable is used, e.g., around liquid nitrogen's temperature when liquid nitrogen is used as refrigerant. The connection electrode preferably has a geometry contacting at least a portion of the superconducting layer as seen circumferentially. If the superconducting layer is formed of a plurality of superconducting wires, in particular, the connection electrode preferably has a geometry capable of electrically connecting all the constituent superconducting wires together. For example it includes a cylinder capable of covering the superconducting layer's outer circumference entirely. If the connection electrode is a cylinder, it is preferably formed of pieces arcuate in cross section combined together to form the cylinder to help to attach the connection electrode to the superconducting layer circumferentially. More specifically, pieces each having a semi-circular, arcuate geometry in cross section combined together are included in the connection electrode.

The connection electrode preferably has a ground wire connected thereto and by attaching the ground wire-attached connection electrode to the superconducting layer at a radially outer portion the superconducting layer, the superconducting shield layer in particular, can be prevented from damage associated with attaching the ground wire and the electrical insulation layer can be prevented from having impaired insulating property. Furthermore, employing the ground wire-attached connection electrode can facilitate grounding the superconducting shield layer. The ground wire is attached to the connection electrode with solder or a bolt or by means of compression connection or similar mechanical connection. In the present invention the superconducting layer has a ground wire attached thereto via the connection electrode. Accordingly, such mechanical connection as described above can also be employed, and the ground wire can be readily and reliably attached. Furthermore, the connection electrode can be attached to the superconducting cable at any desired location, providing excellent workability. Furthermore, for multiphase cables, an increased degree of freedom can be provided in selecting a location at which connection electrodes are linked.

For a multiphase cable including a plurality of cable cores, it is recommended that the cable cores have their respective superconducting layers, their superconducting shield layers in particular, provided with connection electrodes, as described above, respectively, and these connection electrodes be linked by a conductive coupling member to short circuit the superconducting shield layers, and a ground wire attached to the connection electrode associated with any of the cable cores can be grounded to ground the plurality of cable cores collectively. Note that it is sufficient to provide the ground wire-attached connection electrode to any single one of the cable cores. The other cable cores may be provided with ground wire-free connection electrodes, respectively.

The connection electrode and the coupling member are connected, for example for a 3-phase superconducting cable including three cable cores, by the so-called Y connection. More specifically, the cable cores have radially outer portions, respectively, provided with their respective connection electrodes, which have their respective coupling members attached thereto, each at one end, and the coupling members have their respective other ends connected toward the center of the triangle having the connection electrodes as apexes. Alternatively, the so-called Δ connection is also considered. More specifically, the cable cores have radially outer portions, respectively, provided with their respective connection electrodes, which serve as apexes and coupling members link the connection electrodes such that the coupling members correspond to sides linking the apexes (or connection electrodes). For the Y connection the coupling members may have their respective other ends connected by employing a separate, center electrode to connect the coupling members' respective other ends to the center electrode.

The coupling member is preferably formed of flexible material. More specifically, it includes a material formed of a braided material for example. Such a flexible coupling member allows following the movement of the cable core as it is cooled and contracts. As the cable core contracts, tension is caused. The tension is, however, exerted mainly on the flexible coupling member and hardly exerted on the low melting solder having a tendency to have mechanical strength smaller than the above described typical solder. As such, the low melting solder's portion can effectively be protected. Furthermore, if the present terminal structure corresponding to a multiphase cable is accommodated in a splitter box, the flexible coupling member can contribute to excellent workability in linking the connection electrode in the splitter box, which has a limited space, and also absorb a dimensional error, such as positional offset, distortion and the like, introduced as the electrode is linked. If such a flexible coupling member is used and for example the connection electrode is connected in the above described Y connection, the coupling member may be attached so that that portion of the connection electrode at which the coupling member is attached and the portion (or the center electrode) connecting such coupling members together have the same position as seen along the cable cores, although offsetting the portions as seen along the cores can help to attach the coupling member.

It is recommended that the connection electrode be attached such that the protection layer is removed and the superconducting layer, the superconducting shield layer in particular, is exposed. In doing so, to more effectively prevent the electrical insulation layer from having impaired insulating property, it is preferable that the connection electrode and the electrical insulation layer are thermally insulated. For example a tape, a sheet or the like formed of thermally insulating material is wound between the superconducting shield layer and the electrical insulation layer. The thermally insulating material includes glass, fiber reinforced plastic (FRP) and the like. If the superconducting shield layer has multiple layers, and each layer has a connection electrode connected thereto at a portion having a different axial length, connection resistance may vary and a biased current distribution may be invited. Accordingly it is desired that the axial length be equal. Accordingly if the superconducting shield layer is multiple layers, each layer may be stepwise stripped at a portion connected to the connection electrode and an innermost layer (a layer located most adjacent to the electrical insulation layer) is cut to equalize the innermost layer's axial length and the other, stepwise strip layers' axial length to partially expose the electrical insulation layer. Preferably, the exposed electrical insulation layer has a circumference with the above mentioned, thermally insulating tape or the like wound therearound and the connection electrode is attached. Furthermore, the exposed electrical insulation layer may also have a temperature sensor attached thereon to confirm the layer's temperature when low-melting solder is used to attach the connection electrode to the superconducting layer at a radially outer portion.

The present terminal structure is applied in a superconducting cable line for example at a connection linking a superconducting cable and a normal conducting cable together, a connection linking a superconducting cables together or a portion provided with a termination structure such that the terminal structure is provided to a superconducting cable at opposite terminals. Such portions are portions at which a cable terminal is processed to form a connection structure, a termination structure or the like and the connection electrode can be readily arranged.

For a multiphase cable including a plurality of cable cores, the connection structure, termination structure and the like as described above are formed by splitting for each phase, i.e., for each cable core. The split cable cores are housed in a splitter box. More specifically, the multiphase cable's cores assembled at an assembly portion are spaced increasingly as they extend therefrom, and the cable cores are thus housed in the splitter box. The splitter box has a thermal insulation structure to be filled with liquid nitrogen or similar refrigerant to cool the cores.

Each cable core protruding from the box is provided with a thermal insulation pipe filled with liquid nitrogen or similar refrigerant to maintain a superconducting state similarly as maintained in the box. Accordingly, attaching a connection electrode to a superconducting shield layer of each cable core protruding from the splitter box will significantly be cumbersome. The connection electrode may be attached to a superconducting layer of each cable core extracted from the splitter box. Preferably, however, that the connection electrode is attached to the cable core internal to the splitter box as such allows superior workability in attaching the electrode.

It is recommended that in the splitter box each cable core be held by a holding tool. The holding tool includes that capable of holding each cable core and also holding cable cores such that they are spaced. In particular, a holding tool is preferable that has a configuration capable of moving in the splitter box as the cable core expands and contracts.

Furthermore for multiphase cables the superconducting layer, the superconducting shield layer in particular, is preferably grounded only at one end of cable terminal and not grounded at the other end of the cable terminal, since for superconducting cables, grounding at opposite terminals may form a closed loop via the earth and connect superconducting shield layers together via the earth.

Thus, as has been described above, in the present superconducting cable's terminal structure a cable core can have a superconducting layer having a radially outer portion provided with a connection electrode having a ground wire attached thereto to effectively prevent the superconducting layer from damage associated with attaching the ground wire and prevent an electrical insulation layer from impaired insulating property. Furthermore, for multiphase cables, connection electrodes can be linked together to short circuit superconducting shield layers. As such, each cable core's superconducting shield layer can create a magnetic field canceling a magnetic field generated from each superconductor layer, and a large magnetic field generated external to each cable core can be prevented. In particular, in the present invention, the superconducting layer and the connection electrode can be connected with low-melting solder, and attaching the connection electrode does not impair the electrical insulation layer's insulating property.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2A schematically shows a configuration of a connection electrode arranged to surround a superconducting shield layer and FIG. 2B is a partially notched view showing the connection electrode arranged at a portion of a cable core on a superconducting shield layer at a radially outer portion.

FIG. 3 is a schematic cross section showing how the connection electrode and a coupling member are connected in the Y connection.

DESCRIPTION OF THE PREFERRED EMBODIMENTS

Hereinafter the present invention in embodiment will be described.

Figure 1:
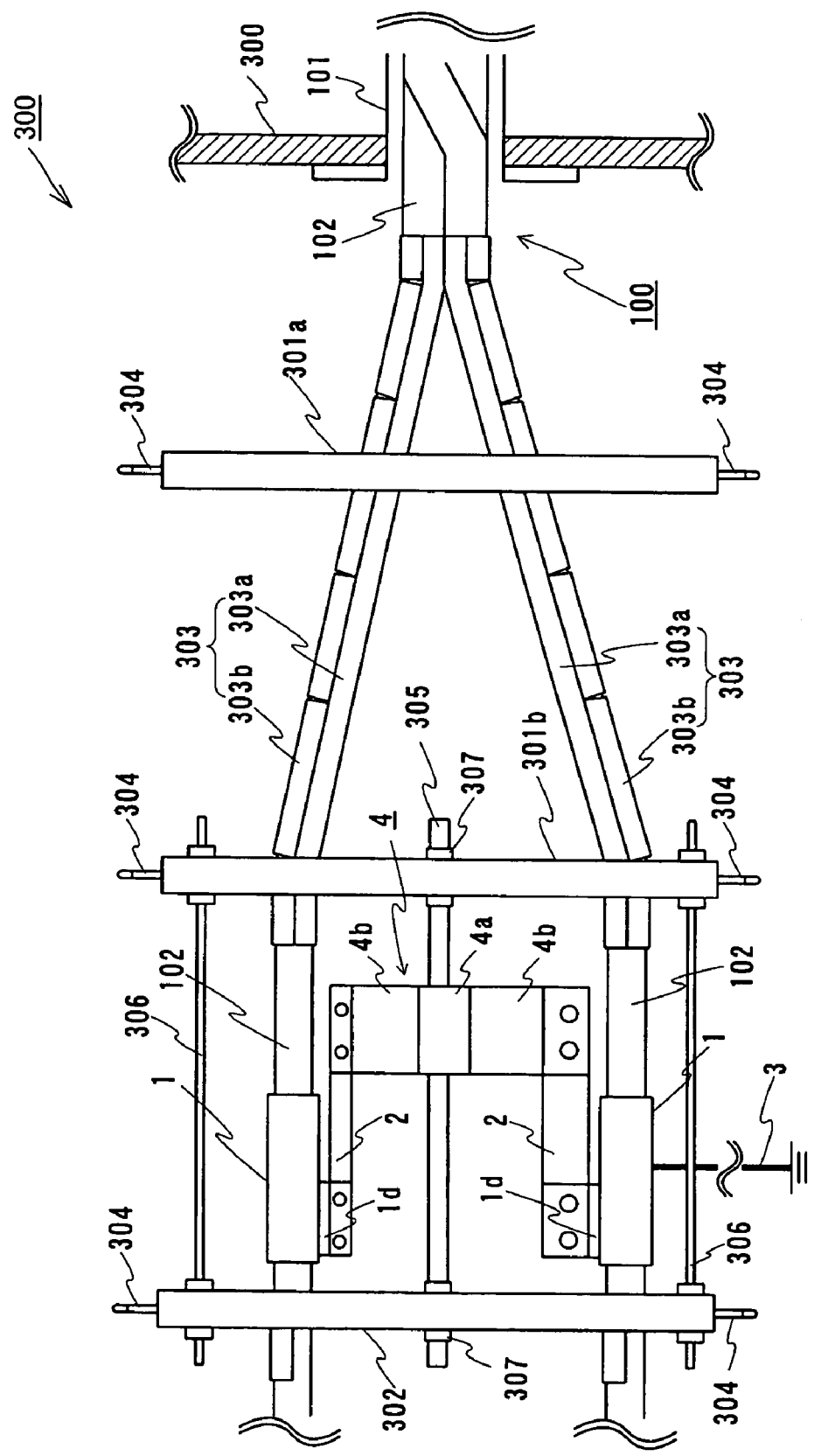
FIG. 1 schematically shows a terminal structure of a superconducting cable in accordance with the present invention.

FIG. 1 shows a superconducting cable line 300 including a terminal structure of a superconducting cable 100. The superconducting cable 100 terminal structure is a terminal structure of a multiphase superconducting cable including a plurality of cable cores 102 having a superconducting layer and an electrical insulation layer, and each cable core 102 has the superconducting layer (in the present embodiment, a superconducting shield layer) surrounded by a connection electrode 1. The superconducting shield layer and connection electrode 1 are connected with a low-melting solder. In the present embodiment 3-phase superconducting cable 100 including three cable cores 102 will be used as an example for description.

Figure 5:
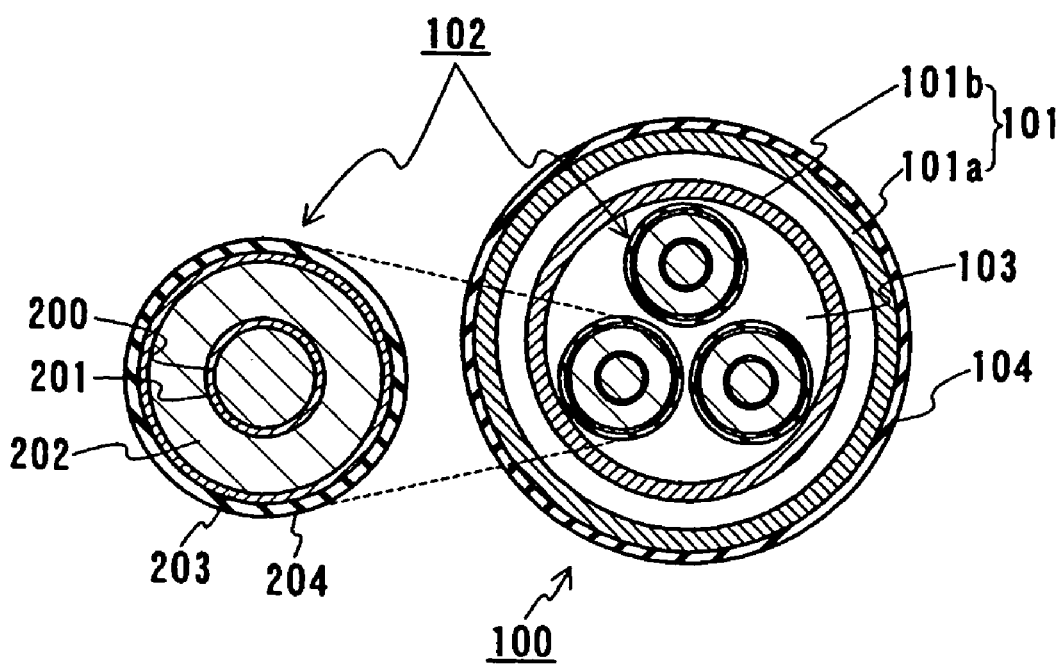
FIG. 5 is a cross section of a 3-phase superconducting cable using three cores collectively.

The present embodiment employs 3-phase superconducting cable 100, which is similar in configuration to that shown in FIG. 5. More specifically, as seen radially outwards, cable core 102 includes former 200, a superconductor layer 201, an electrical insulation layer 202, a superconducting shield layer 203 and a protection layer 204. For 3-phase superconducting cable 100 three cable cores 102 are twisted together and accommodated in a thermal insulation pipe 101. Former 200 is constructed by twisting a plurality of copper wires each coated with an insulator. Superconductor layer 201 and superconducting shield layer 203 are constructed by winding in a spiral manner a Bi2223-based superconducting tape-shaped wire (Ag—Mn sheath wire) in layers around former 200 and electrical insulation layer 202, respectively. Electrical insulation layer 202 is constructed by winding insulation paper formed of polypropylene and kraft paper in lamination (polypropylene laminated paper (PPLP®) manufactured by Sumitomo Electric Industries, Ltd.) around superconductor layer 201. Protection layer 204 is constructed by winding kraft paper around superconducting shield layer 203. Thermal insulation pipe 101 is an SUS corrugated pipe. Between an outer pipe 101a and an inner pipe 101b an insulator is arranged in layers. Pipes 101a and 101b form a double pipe, which is internally vacuumed. More specifically, thermal insulation pipe 101 has a vacuumed, multilayered, thermal insulation structure. Thermal insulation pipe 101 has a radially outer portion provided with an anticorrosion layer 104 of polyvinyl chloride.

The above described 3-phase superconducting cable 100 is twisted and thus accommodated in thermal insulation pipe 101 and at the terminal portion cable cores 102 are spaced and thus split, and accommodated in a splitter box 300. Cable cores 102 thus split have their respective superconducting shield layers provided with connection electrodes 1, respectively, at a radially outer portion, and connection electrodes 1 are connected to a conductive, coupling member 2 to electrically connect the superconducting shield layers together, or short-circuit the layers.

With reference to FIGS. 2A and 2B, connection electrode 1 includes a semi-circular, arcuate pieces 1a and 1b, as seen in cross section, combined together to provide a cylindrical geometry. Pieces 1a and 1b have opening edges provided with flanges 1c, respectively, extending along connection electrode 1. Pieces 1a and 1b have their respective flanges 1c faced to each other, receiving and passing a bolt or similar fixture through a hole (not shown) and clamped together by screwing a nut to form the cylindrical geometry. One piece 1a has a fixture 1d to which coupling member 2, described hereinafter, is connected, and a hole 1e introducing low-melting solder between connection electrode 1 and the superconducting shield layer. While in the present embodiment two holes 1e are shown by way of example, a single hole 1e may be provided. In the present embodiment connection electrode 1 is formed of copper.

Connection electrode 1 is attached such that cable core 102 has protection layer 204 removed to expose superconducting shield layer 203. In the present embodiment superconducting shield layer 203 is configured of the two layers of inner and outer layers 203a and 203b. Accordingly it is recommended that the layer be stripped stepwise so that a superconducting wire configuring each layer 203a, 203b can contact low-melting solder 5.

Furthermore, connection electrode 1 not only short circuits superconducting shield layers 203 but may also have a ground wire 3 attached thereto. In the present embodiment piece 1b has ground wire 3 attached thereto, as shown in FIGS. 2A and 2B. Alternatively, piece 1a may have the ground wire attached thereto. Ground wire 3 can be attached with typical solder.

With reference to FIG. 1, in the present embodiment, coupling member 2 is formed of a braided material of copper. Furthermore, in the present embodiment, connection electrode 1 and coupling member 2 are connected by Y connection, and coupling members 2 are connected together by a separately prepared center electrode 4. In the present embodiment, fixture 1d and center electrode 4 are positionally offset as seen lengthwise, and coupling member 2 has one end connected to fixture 1d and the other end connected to center electrode 4 so that coupling member 2 is arranged along cable core 102.

Center electrode 4 is formed of a conductive material (in the present embodiment, copper) and includes a ring 4a at the center and an attachment 4b arranged on ring 4a circumferentially at equal intervals to connect coupling member 2. A long bolt 305 fixed between first and second holding tools 301b and 302b holding cable core 102, as will be described later, is inserted into ring 4a and center electrode 4 is fixed to long bolt 305. As such when the cable is cooled and cable 102 accordingly contracts moves, contact electrode 1 and center electrode 4 can follow the movement of core 102 as coupling member 2 flexes and expands in a fixed condition. Furthermore, a large portion of tension caused as cable core 102 contracts is exerted on coupling member 2, which is flexible, and the low melting solder hardly experiences tension. Connection electrode 1 can thus be prevented from being removed from superconducting shield layer 203 as cable core 102 expands and contracts.

Connection electrode 1 is arranged on superconducting shield layer 203 at a radially outer portion in a procedure, as will be described hereinafter with reference to FIGS. 2, and 2A and 2B. At a terminal portion of a superconducting cable, cable cores 102 are split and each cable core 102 at a portion provided with connection electrode 1 has a protection layer removed therefrom to expose superconducting shield layer 203. In the present embodiment, the cable core is stripped stepwise to allow superconducting shield layer 203 to have inner and outer layers 203a and 203b both exposed and an interlayer insulation layer (a layer formed by a wound electrical insulation paper) present between inner and outer layers 203a and 203b is removed. Furthermore in the present embodiment inner layer 203a is cut to expose a portion of electrical insulation layer 202 so that inner layer 203a at a portion connected to connection electrode 1 has an axial length equal to outer layer 203b. The exposed superconducting shield layer 203 and electrical insulation layer 202 may have a thermocouple attached thereon to confirm each layer's temperature.

The exposed electrical insulation layer 202 preferably has a radially outer portion provided with a thermal insulation layer 6 to prevent impaired insulating property attributed to heat transmitted while soldering. Thermal insulation layer 6 is formed for example of glass fiber cloth tape. Furthermore, if superconducting shield layer 203 has a portion to which low-melting solder 5 is not applied, it is recommended that the portion be masked. If layer 203 has a portion to which solder 5 is applied, the portion is preferably solder-plated to help low-melting solder 5 to adhere to the portion. Furthermore, solder-plating may be facilitated for example by polishing or washing a surface of the superconducting shield layer. The layer may be solder plated while each layer's temperature is confirmed via the thermocouple.

Connection electrode 1 is arranged on superconducting shield layer 203 at a radially outer portion. Connection electrode 1 passes an electric current to superconducting shield layer 203 at fixture 1d. Accordingly, a portion closer to fixture 1d is smaller in connection resistance. As such in a superconducting tape line configuring the superconducting shield layer 203 inner and outer layers 203a and 203b a wire closer to fixture 1d is smaller in connection resistance and a wire farther from fixture 1d is larger in connection resistance. In other words, inner and outer layers 203a and 203b are both vary in circumferential connection resistance depending on location relative to fixture 1d. Accordingly in the present embodiment, as shown in FIG. 2B, connection electrode 1 is arranged to connect connection electrode 1 and superconducting shield layer 203 as remote as possible from fixture 1d, as shown in FIG. 2B. Furthermore in the present embodiment pieces 1a and 1b are arranged to cover superconducting shield layer 203 and pieces 1a and 1b have their flanges 1c facing each other and clamped with a bolt to fix connection electrode 1 on superconducting shield layer 203 at radially outer portion. In doing so, hole 1e formed in connection electrode 1 to introduce the low melting solder may have a thermocouple attached in a vicinity thereof by means of tape or the like to confirm the temperature of connection electrode 1. Furthermore, a gasket may be interposed or heat resistive tape may be wound or a similar sealing may be provided to prevent the low melting solder from leaking from the two opposite pieces 1a and 1b between their flanges 1c and connection electrode 1 at its opposite ends. The gasket arranged between flanges 1c includes a sheet of silver, a sheet of indium or other similar soft material. The heat resistive tape includes glass tape and the like.

The low melting solder is introduced through hole 1e. In doing so, a heating means is required for placing the solder in liquid phase. If the heating means is a burner, a soldering iron or the like, connection electrode 1 would have a local portion heated to high temperature and electrical insulation layer 22 underlying that portion may have its insulating property impaired. Accordingly, a heater is used as the heating means and attached to cover connection electrode 1 at a radially outer portion. Connection electrode 1 can thus uniformly be heated. Desirably in introducing the low melting solder the thermocouple is monitored and the heater's output is adjusted to prevent electrical insulation layer 202 from having a temperature exceeding 130° C., preferably to set a temperature of 120° C. or less. In the present embodiment the low melting solder is a solder having a melting point of approximately 78° C. (with a chemical composition of 9.3% by mass of Sn, 34.5% by mass of Pb, 50% by mass of Bi, and 6.2% by mass of Cd). After the solder is introduced, the thermocouple, the sealing and the like are removed. Thus a structure with connection electrode 1 and superconducting shield layer 203 connected with the low melting solder can be provided.

After cable cores 102 are provided with connection electrodes 1 on superconducting shield layers 203 at radially outer portions, respectively, connection electrodes 1 are linked together by coupling member 2 to short circuit superconducting shield layer 203. More specifically, coupling member 2 has one end connected to connection electrode 1 at fixture 1d by a bolt and the other end connected to center electrode 4 at attachment 4b by a bolt. Cable cores 102 can thus have their respective superconducting shield layers 203 short-circuited together.

For the 3-phase superconducting cable described in the present embodiment one of three cable cores 102 is provided with connection electrode 1 having ground wire 3 previously attached thereto. As three cable cores 102 have their respective superconducting shield layers 203 short-circuited by connection electrode 1, coupling member 2 and center electrode 4, grounding ground wire 3 can ground the three cable core 102 superconducting shield layers 203 collectively. Preferably, the FIG. 1 terminal structure is provided at opposite ends of superconducting cable 100 and the cable is grounded only at one end so that cable cores 102 will not have superconducting shield layers 203 connected via earth.

In the present terminal structure a connection electrode can be arranged on a superconducting shield layer at a radially outer portion and have a ground wire attached thereto to prevent the superconducting shield layer from damage associated with attaching the ground wire and prevent an electrical insulation layer underlying the superconducting shield layer from having impaired insulating property. In particular, as the connection electrode and the superconducting shield layer can be connected with low melting solder, the electrical insulation layer can effectively be prevented from having impaired insulating property associated with attaching the connection electrode. Furthermore, the connection electrode and the conductive coupling member that link cable cores' respective superconducting shield layers provide short circuit between the superconducting shield layers when the cable has a current flowing therethrough. In other words, in the present invention, superconducting shield layers are connected with small interconnection resistance, and a current flowing through each superconducting shield layer can substantially be equalized in magnitude to that flowing through each superconductor layer, respectively. As such, a magnetic field sufficient to cancel a magnetic field generated from each superconductor layer can be created to prevent a large magnetic field generated external to each cable core. Furthermore, the superconducting shield layers short-circuited can be grounded collectively and hence efficiently.

Note that the portion of cable core 102 split and provided with connection electrode 1 is accommodated in a splitter box 300. Splitter box 300 accommodates three cable cores 102 such that they are increasingly spaced. Furthermore, splitter box 300 preferably has a heat insulation structure as it is filled with liquid nitrogen or similar refrigerant to cool core 102 accommodated therein. In the present embodiment splitter box 300 has a cylindrical geometry. Ground wire 3 attached to connection electrode 1 is extracted from splitter box 300 and grounded. It is recommended that Ground wire 3 and splitter box 300 be hermetically sealed to maintain hermeticity.

Cable cores 102 accommodated in splitter box 300 extend from one side box of 300 (or an assembly portion of core 102, shown in FIG. 1 at the right hand) toward the other side of box 300 (or a split termination of core 102, as seen in FIG. 1 at the left hand) such that cable cores 102 are increasingly spaced and they held with a fixed distance therebetween. In the FIG. 1 example, a first holding tool 301a holding the assembly portion, a first holding tool 301b holding an intermediate portion, a second holding tool 302 holding the split termination, and an intermediate holding tool 303 holding cable core 102 between the first holding tools 301a and 301b hold cable core 102.

The first holding tool 301a has a center provided with an annular portion. The annular portion has an outer circumference with equally spaced, three intermediate holding tools 303 and a member in the form of a sector, arranged between intermediate holding tools 303, fixed thereto. The first holding tool 301a is arranged between core 102 so as to position the annular portion's center substantially at the center of the space surrounded by the three cable cores 102 and by arranging cable cores 102 at intermediate holding tools 303, respectively, cable cores 102 are spaced and thus held. In the present embodiment a sliding portion 304 substantially point-contacting an inner surface of box 300 is provided to the sector member so that the first holding tools 301a can also move within box 300 as cable core 102 expands and contracts. The first holding tool 301b is basically similar in configuration to the first holding tool 303a, except that the former has an annular portion larger in diameter than the latter. The first holding tools 301a and 301b are linked by intermediate holding tool 303.

The second holding tool 302 is substantially similar in configuration to the first holding tool 301b. The first and second holding tools 301b and 302 are linked by a plurality of long bolts and held with a fixed spacing therebetween. Furthermore, the first and second holding tools 301b and 302 each have an annular portion provided with a cylindrical insulation member 307 formed of FRP or similar insulation material and receiving long bolt 305.

Intermediate holding tool 303 includes an elongate, semicircular, arcuate or canaliculate member 303a fixed to the first holding tools 301a, 301b annular portion at a radially outer portion, and a plurality of short, semi-circular, arcuate member 303b combined with canaliculated member 303a to surround cable core 102 circumferentially to form a cylinder. In the present embodiment member 303a and members 303b are first arranged on cable core 102 at a radially outer portion which is then clamped with a band (not shown) or similar clamping member for fixture on cable core 102 at the radially outer portion to hold the core. Intermediate holding tool 303 may be provided with a through hole, as appropriate, to help cable core 102 accommodated therein to contact a refrigerant.

In the FIG. 1 example, the connection electrode is attached at a split termination having cable cores sufficiently spaced. The connection electrode can be readily and hence efficiently attached.

Figure 4:
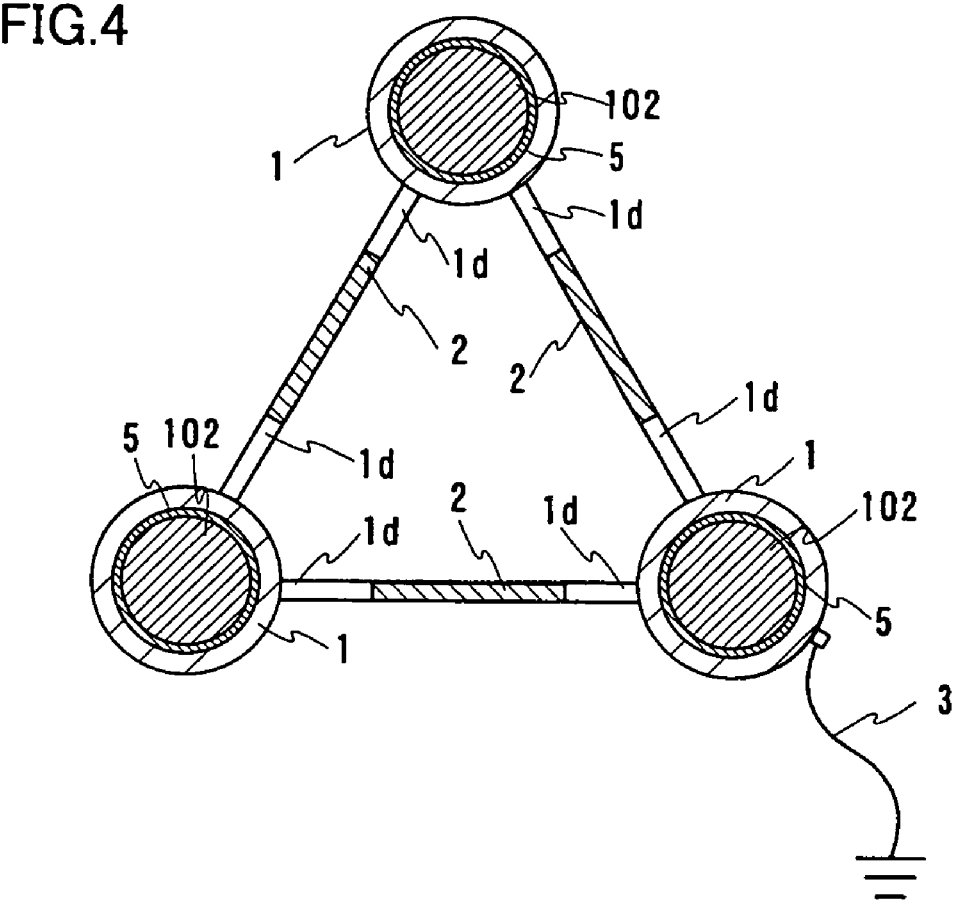
FIG. 4 is a schematic cross section showing how the connection electrode and the coupling member are connected in the Δ connection.

In the FIG. 1 configuration, center electrode 4 and the connection electrode 1 fixture 1d are positionally offset as seen lengthwise. Alternatively, as shown in FIG. 3, connection electrode 1 and center electrode 4 may have fixture 1d and attachment 4b, respectively, set at a single position and fixture 1d and attachment 4b may be linked by coupling member 2 in the Y connection. More specifically, fixture 1d of each of three connection electrodes 1 arranged on cable cores 102 at radially outer portions, respectively, and attachment 4b connected to center electrode 4 at ring 4a may be arranged opposite and linked by coupling member 2. Alternatively, as shown in FIG. 4, the center electrode may be dispensed with, and pieces 1a and 1b each having fixture 1d connected thereto or only one of which has two fixtures 1d connected thereto may be used to allow a connection electrode 1 and another connection electrode 1 to have their respective fixtures 1d linked by coupling member 2 to provide the Δ connection. In other words, three coupling members 2 may form the three sides of a triangle having apexes corresponding to three connection electrodes 1 arranged on cable cores 102 at radially outer portions, respectively.

The present terminal structure is suitable for constructing a terminal portion of a superconducting cable. Furthermore the present terminal structure is also suitable for constructing a superconducting cable line including such a terminal structure.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A terminal structure of a superconducting cable, said superconducting cable including a cable core, said cable core having a superconductor layer, an electrical insulation layer, and a superconducting shield layer, said terminal structure of said superconducting cable comprising:

a connection electrode arranged on said superconducting shield layer at a radially outer portion of said superconducting shield layer;

wherein said connection electrode and said superconducting shield layer are connected with a low melting solder; and wherein said electrical insulation layer is arranged between said superconductor layer and said superconducting shield layer.

2. The terminal structure of said superconducting cable of claim 1, wherein said low melting solder has a melting point of at least 60° C. and at most 120° C.

3. The terminal structure of said superconducting cable of claim 1, wherein said connection electrode is thermally insulated from said electrical insulation layer.

4. The terminal structure of said superconducting cable of claim 1, wherein said connection electrode has a ground wire attached thereto.

5. The terminal structure of said superconducting cable of claim 1, wherein said superconducting cable is a multiphase cable comprising a plurality of cable cores including said cable core;

wherein each cable core of the plurality of cable cores comprises a respective superconductor layer, a respective electrical insulation layer, and a respective superconducting shield layer;

wherein said terminal structure of said superconducting cable further comprises a plurality of connection electrodes including said connection electrode;

wherein each connection electrode of the plurality of connection electrodes is arranged on a corresponding superconducting shield layer of a corresponding cable core of the plurality of cable cores at a radially outer portion of said corresponding superconducting shield layer; and wherein each connection electrode of the plurality of connection electrodes is linked to another connection electrode of the plurality of connection electrodes by a conductive coupling member.

6. The terminal structure of said superconducting cable of claim 5, wherein said conductive coupling member is formed of a braided material.

7. A superconducting cable line, comprising:

a terminal structure of a superconducting cable, said superconducting cable including a cable core, said cable core having a superconductor layer, an electrical insulation layer, and a superconducting shield layer, said terminal structure of said superconducting cable comprising:

a connection electrode arranged on said superconducting shield layer at a radially outer portion of said superconducting shield layer;

wherein said connection electrode and said superconducting shield layer are connected with a low melting solder; and wherein said electrical insulation layer is arranged between said superconductor layer and said superconducting shield layer.

* * * * *

UNITED STATES PATENT AND TRADEMARK OFFICE
CERTIFICATE OF CORRECTION

| | | |
|---|---|---|
| PATENT NO. | : 7,166,804 B2 | Page 1 of 1 |
| APPLICATION NO. | : 10/947273 | |
| DATED | : January 23, 2007 | |
| INVENTOR(S) | : Hiroyasu Yumura et al. | |

It is certified that error appears in the above-identified patent and that said Letters Patent is hereby corrected as shown below:

On the Title page, item (73), the Assignee should be:

Sumitomo Electric Industries, Ltd., Osaka (JP) and

The Tokyo Electric Power Company, Incorporated, Tokyo (JP)

Signed and Sealed this

Tenth Day of July, 2007

JON W. DUDAS
*Director of the United States Patent and Trademark Office*